United States Patent
Huang

(10) Patent No.: US 8,973,902 B2
(45) Date of Patent: Mar. 10, 2015

(54) POWER WINCH HORIZONTAL-PULL CLUTCH DEVICE

(71) Applicant: Comeup Industries Inc., Taipei (TW)

(72) Inventor: Shih Jyi Huang, Taipei (TW)

(73) Assignee: Comeup Industries Inc., Taipei (TW)

( * ) Notice: Subject to any disclaimer, the term of this patent is extended or adjusted under 35 U.S.C. 154(b) by 159 days.

(21) Appl. No.: 13/724,263

(22) Filed: Dec. 21, 2012

(65) Prior Publication Data

US 2014/0174879 A1 Jun. 26, 2014

(51) Int. Cl.
*B66D 1/14* (2006.01)
*F16D 11/16* (2006.01)
*B66D 1/00* (2006.01)

(52) U.S. Cl.
CPC *F16D 11/16* (2013.01); *B66D 1/00* (2013.01); *B66D 1/14* (2013.01)
USPC .......................................... 254/355; 254/370

(58) Field of Classification Search
CPC .............. B66D 1/14; B66D 1/16; B66D 1/18; B66D 1/56; B66D 1/58; B66D 3/24; F16D 11/16
USPC ......... 254/298, 299, 301, 302, 309, 317, 346, 254/355, 370
See application file for complete search history.

(56) References Cited

U.S. PATENT DOCUMENTS

2010/0155190 A1* 6/2010 Xie et al. ........................ 192/71

* cited by examiner

*Primary Examiner* — Emmanuel M Marcelo
*Assistant Examiner* — Angela Caligiuri
(74) *Attorney, Agent, or Firm* — Bacon & Thomas, PLLC

(57) ABSTRACT

A power winch horizontal-pull clutch device provides dynamic forces from a power source and uses a deceleration device to retard the force transmission to a cable pulley for releasing and rewinding a steel cable on the cable pulley. A connecting slot is formed on a casing of the deceleration device. The deceleration device includes an outer ring body and at least one insert slot formed on an external surface. The power winch includes a clutch device for selectively fixing the connecting slot to the insert slot to transmit the dynamic force from the deceleration device to the cable pulley. The clutch device is a sealed assembly and a control handle is provided for making a horizontal movement to achieve the clutching effect and prevent water, dust or other foreign matters from entering into the clutch device, damaging components, causing failure or malfunction, or clamping an operator's hand or foreign matters.

3 Claims, 6 Drawing Sheets

POWER WINCH HORIZONTAL-PULL CLUTCH DEVICE

BACKGROUND OF THE INVENTION

1. Field of the Invention

The present invention relates to a power winch clutch device, and more particularly to the power winch horizontal-pull clutch device capable of preventing a user's hand or other foreign matters from being clamped by the clutch device of the winch and preventing water, dusk or other foreign matters from entering into the clutch device of the power winch.

2. Description of the Related Art

Power winch, also known as hoist winch or simply winch, is a hoist apparatus used for rewinding or releasing a steel cable to hoist or unload a heavy object. In general, the power winch is installed and used at a place such as a tall building for hoisting, elevating or descending goods or installed at a jeep or an off-road vehicle for towing other cars and rescuing oneself or others. Since the power winch rewinds or releases a steel cable to pull the heavy object or a load, therefore the dynamic driving force of the power winch can drive a cable pulley to rotate forward and backward. In other words, the dynamic driving force of the cable pulley controlled by the power winch is used for rotating the cable pulley forward or backward, so as to further control the operation of releasing or rewinding the steel cable. In short, the steel cable is rewound or released by the dynamic force.

Since the power winch is designed for releasing and rewinding the steel cable by the dynamic force, therefore it is necessary to decelerate the transmission of the dynamic force in the power winch to prevent a too-fast speed of winding or releasing the steel cable. In emergency (such as a rescue of a car), the speed for the dynamic force to release the steel cable generally does not meet user requirements and usually makes an operator to worry about the situation. To overcome such shortcoming, a conventional power winch comes with a clutch device, so that when the clutch device is "disengaged" or set to an "open" operation mode, the dynamic force transmitted from the cable pulley of the steel cable is disconnected, so that the rotation of the cable pulley is not related or restricted by the dynamic force, and the operator can manually pull the steel cable out directly and quickly (and such operation is a manual releasing of the steel cable, and the operator can hook the steel cable to a rescue vehicle or heavy object more quickly, and then the clutch device is "engaged" to resume its original "close" operation mode, so as to transmit the dynamic force to the cable pulley again to rewind the steel cable, and achieve the effects of pulling back a car, a heavy object or a load by the dynamic force.

There are various types of conventional power winch clutch devices with different assemblies and operation modes such as the following patents issued to the inventor of the present inventions, and these power winch clutch devices are disclosed in R.O.C. Utility Model No. 186419 entitled "Cable pulley clutch of electric winch", R.O.C. Utility Model No. 188404 entitled "Braking of electric winch and clutch device thereof", P.R.C. Utility Model No. ZL01204721.X entitled "Brake of electric winch and clutch device thereof". R.O.C. Utility Model No. M291421 entitled "Power winch clutch device", P.R.C. Utility Model No. ZL200520145068.5 entitled "Power winch clutch device", R.O.C. Utility Model No. M344336 entitled "Winch clutch device", P.R.C. Utility Model No. ZL200820128343.6 entitled "Winch clutch device" and U.S. Pat. No. 7,648,125 entitled "Winch clutch assembly". In R.O.C. Utility Model No. 186419 entitled "Cable pulley of electric winch": comprises a bias turning member installed at a front end of an external side of a winch machine, a link rod pivotally coupled into the winch machine, and a driving gear installed at a rear end for connecting a dynamic force source and a cable pulley, such that when the bias turning member is turned and deflected outwardly, the link rod is driven to move outwardly to separate the driving gear from the cable pulley, so as to disconnect the dynamic force from the cable pulley, and then the bias turning member is turned to resume its original position, the dynamic force is connected to the cable pulley, so that the dynamic force can be used for rewinding or releasing the steel cable. However, when the bias turning member is turned and deflected outwardly, an installation hole formed on the machine is exposed, so that water (such as rainwater), dust, mud or other small foreign matters may enter into the machine through the installation hole easily, and the accumulated water may damage the power winch. In addition, when the bias turning member is deflected outwardly and fixed at a position, the bias turning member may be deflected to resume its original position or even injures the operator, clamps a foreign matter, damages a component or causes a wrong movement, when the bias turning member is pushed accidentally.

R.O.C. Pat. No. 188404 entitled "Braking of electric winch and clutch device thereof" and P.R.C. Utility model ZL01204721.X entitled "Brake of electric winch and clutch device thereof" provide a clutch lever that can be pulled upwardly and passed into a clutch bushing disposed at a brake opening. When the clutch lever is pulled and lifted, the bottom end of the clutch lever is detached from the connection between the dynamic force and the cable pulley to manually release the steel cable. On the other hand, the clutch lever is descended, so that the bottom end of the clutch lever enters into the brake opening to connect the dynamic force with the cable pulley, so that the steel cable can be released and rewound by the dynamic force. After the clutch lever is pulled and lifted again, the gap between the clutch lever and the clutch bushing is exposed obviously, so that water (such as rainwater), dust, mud or any other small foreign matter may enter into the clutch bushing from the gap or damage the whole power winch easily. In addition, when the clutch lever is descended, the clutch lever may injure the operator or clamp a foreign matter, or even cause damages to components or a wrong action.

In R.O.C. Utility Model No. M291421 entitled "Power winch clutch device" and P.R.C. Utility Model No. ZL200520145068.5 entitled "Power winch clutch device", a knob cover installed on a side of a casing of a deceleration device can be turned in forward and backward directions to drive a clutch slide block in a clutch seat to move and push an axis to move synchronously and engage or disengage an axial gear with an inner circular gear, so as to achieve the effect of disconnecting or connecting the dynamic force with the cable pulley. However, there is a small gap existed between the knob cover and the opening for the installation, so that after a long time of use, water, dust, and mud may enter from the gap to cause damages to components or a wrong action.

In R.O.C. Utility Model No. M344336 entitled "Winch clutch device", P.R.C. Utility Model No. ZL200820128343.6 entitled "Winch clutch device" and U.S. Pat. No. 7,648,125 entitled "Winch clutch assembly", a rotating member installed on a side of the winch clutch device is provided for making a forward or backward rotation of a small angle to link components in a deceleration device for an engaged or disengaged effect. However, there is also a small gap existed between the rotating member and an opening for installation, so that after a long time of use, water, dust, and mud may enter from the gap to cause damages to components or a wrong action.

From the description above, the conventional clutch device of a power winch has holes or gaps exposed to the outside, so that water, dust, mud or any other small foreign matter may enter into the clutch device. The conventional clutch device also has the drawbacks of accidentally injuring the operator, clamping a foreign matter, damaging components or causing a wrong action during the operation of the clutch device.

SUMMARY OF THE INVENTION

In view of the aforementioned drawbacks, the present invention based on years of experience in the related industry to conduct extensive researches and experiments, and finally developed a power winch horizontal-pull clutch device in accordance with the present invention to overcome the drawbacks of the prior art.

Therefore, it is a primary objective of the present invention to provide a power winch horizontal-pull clutch device to prevent water, dust or other foreign matters from entering or prevent an operator's hand or any other foreign matter from being clamped.

To achieve the aforementioned objective, the present invention provides a power winch horizontal-pull clutch device that provides a dynamic force by a power source, and transmits the dynamic force to a cable pulley after the clutch device is decelerated by a deceleration device, so that the cable pulley can be rotated in forward and backward directions to release and rewind a steel cable wound on the cable pulley respectively; a casing of the deceleration device has a connecting slot formed thereon and an internal thread formed on an inner wall of the casing; the deceleration device comprising an outer ring body, and an insert slot formed on an external surface; the power winch comprises a clutch device, and the connecting slot formed on the casing of the deceleration device can be fixed or not fixed to the insert slot of the outer ring body, so that a dynamic force can be transmitted or not transmitted from the deceleration device to the cable pulley; characterized in that the clutch device comprises an internal seat, an external sleeve, a control handle, a cap, a clutch lever, an elastic element, a binding ring, a wedge-shaped member and a positioning nut, wherein the internal seat comprises a cylindrical lower insert pipe, a cylindrical upper insert pipe and an outwardly expanded baffle disposed at the middle, and an external thread is formed on an outer wall of the lower insert pipe, and an opening is formed at a bottom end of the internal seat, and a chamber is formed deeply therein, and a non-circular polygonal groove is formed and penetrated through a top end of the upper insert pipe; the external sleeve is in a cylindrical shape, and the control handle is fixed onto the external surface, and the bottom of the external sleeve is extended into a lower containing cavity, and the lower containing cavity has an upwardly formed penetrating groove which is extended and expanded outwardly to form an upper chamber with a plug opening formed at a top surface and provided for plugging and installing the cap, and a set of radially installed lifting rods are installed at positions proximate to the bottom inside the upper chamber, and an interval between inner ends of the two lifting rods is not smaller than the width of the penetrating groove; the clutch lever has an insert member contained in the chamber and downwardly passed out from the opening by a selective control and pressed into the insert slot of the outer ring body; a non-cylindrical polygonal column is coupled to the top surface of the insert member and has a polygonal shape matched with the shape of the polygonal groove of the internal seat, and the elastic element is sheathed on the polygonal column, and a ring groove is concavely formed on an external surface of the polygonal column and at a position proximate to the top end for clamping the binding ring; the wedge-shaped member has a circular dish shaped base, a polygonal groove penetrated through the middle for passing the polygonal column of the clutch lever, and a set of tuning members are installed with a symmetrical curve on both lateral sides of the bottom of the base, and the bottom of each tuning member is divided into a descending slope and a press-in slot, and the descending slope descends gradually from the bottom of the base and passes through a boundary to enter into the press-in slot when reaching the lowest position, and an interval is formed between the two tuning members and the narrowest interval occurs at an edge of the base, so as to form a through hole with a width not smaller than the width of the lifting rod; the positioning nut has a polygonal operating member with a connecting slot penetrated through the middle and an internal thread formed on an inner wall of the polygonal operating member; during assembling, the elastic element is sheathed on the polygonal column of the clutch lever, and the polygonal column is passed and passed into the polygonal groove of the internal seat to achieve a connection of the same shape, while the insert member of the clutch lever is entered into the chamber of the internal seat; and then the upper insert pipe of the internal seat is installed into the lower containing cavity of the external sleeve, such that the polygonal column of the clutch lever is passed through an interval between the penetrating groove and the two lifting rods and entered into the upper chamber, and then the wedge-shaped member is installed in the upper chamber, such that the two through holes of the wedge-shaped member are disposed on a lifting rod, and the polygonal column of the clutch lever is passed into the polygonal groove of the wedge-shaped member to achieve a connection of the same shape, and then the binding ring is clamped into the groove of the polygonal column, and then the positioning nut is screwed and connected by engaging the internal thread of the connecting slot with the external thread of the lower insert pipe of the internal seat, and the lower insert pipe of the internal seat is rotated from the external thread into the internal thread of the connecting slot on the casing of the deceleration device, so that the lower insert pipe and the connecting slot are combined, and finally the cap is plugged into the plug opening of the upper chamber In the power winch horizontal-pull clutch device, the internal seat further includes a ring groove concavely formed on an external surface of the internal seat for sheathing an O-ring.

In the power winch horizontal-pull clutch device, the connecting slot formed on the casing of the deceleration device has a sunken cavity with an expanded external diameter formed at the top surface, and the positioning nut has a press-in member disposed at the bottom of the operating member and contained and fixed in the sunken cavity.

DETAILED DESCRIPTION OF THE PREFERRED EMBODIMENTS

The objectives, technical characteristics, measures, effects and advantages of the present invention will become apparent with the detailed description of preferred embodiment accompanied with the illustration of related drawings as follows.

Figure 1:
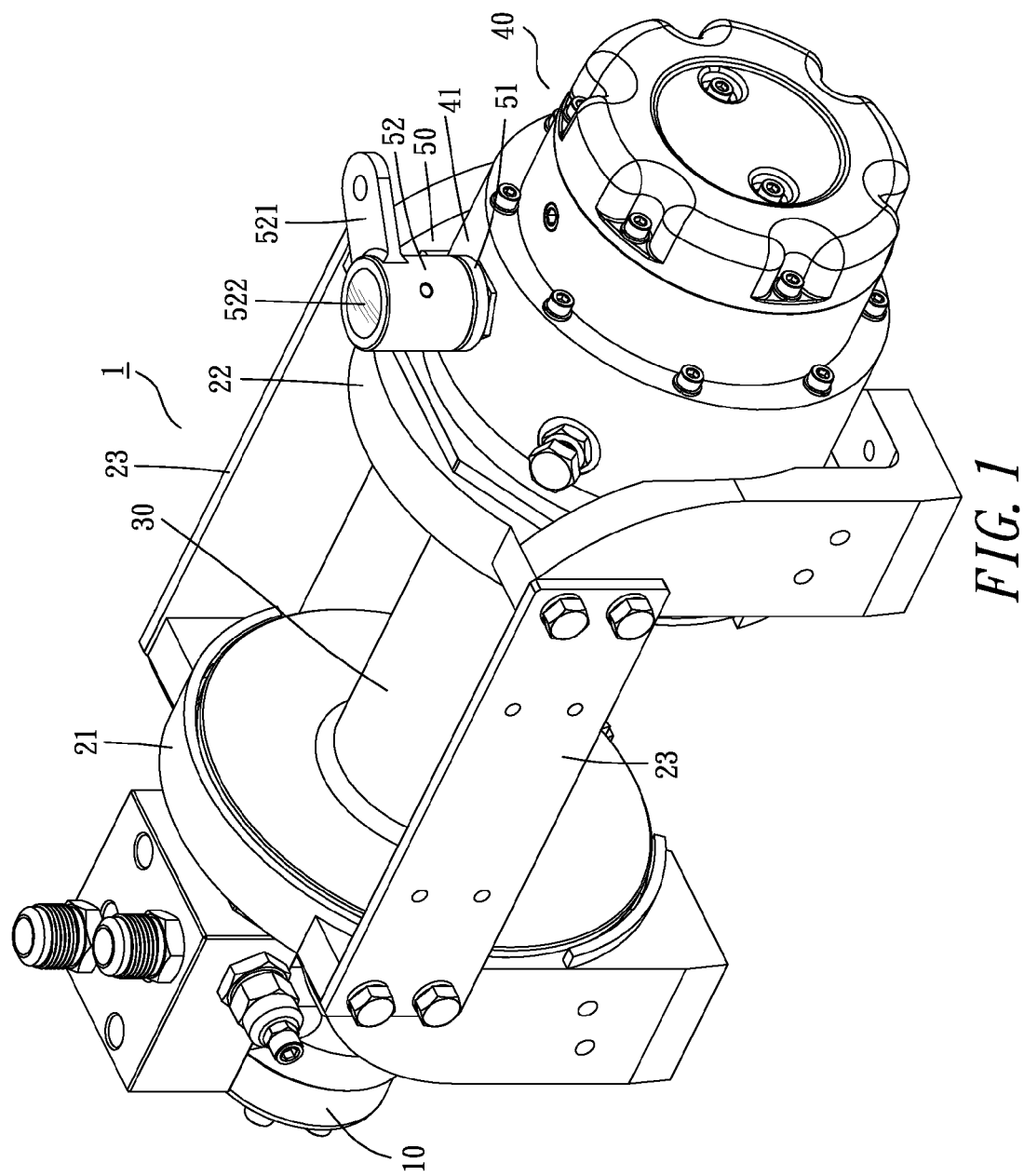
FIG. 1 is a perspective view of a preferred embodiment of the present invention situated at an "engaged" mode.
Figure 2:
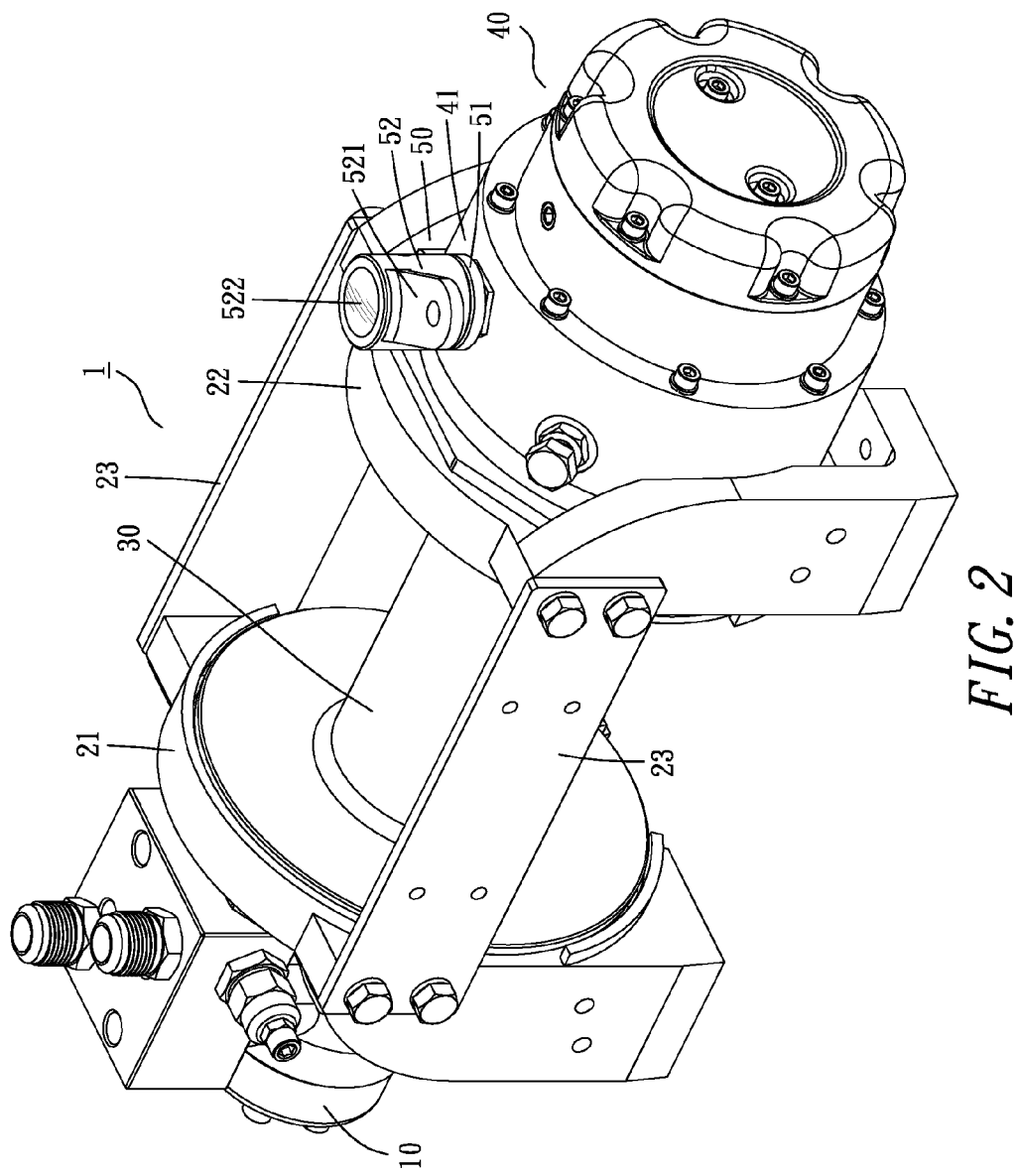
FIG. 2 is a perspective view of a preferred embodiment of the present invention situated at a "disengaged" mode.

With reference to FIGS. 1 and 2 for a power winch 1 of a preferred embodiment of the present invention, the power winch 1 comprises: a power source 10 (such as a motor) installed on a side of the power winch 1; a set of fixed bases 21, 22 supported by a plurality of frame plates 23 to define a gap and substantially disposed at the middle positions of the power winch 1 and the fixed base 21 disposed adjacent to the power source 10 being fixed onto a side of the power source 1; a cable pulley 30, installed between the fixed bases 21, 22, wherein the fixed bases 21, 22 are not coupled by any connecting assembly or dynamic force, and the cable pulley 30 is provided for winding a steel cable (not shown in the figure), and an outer end of the steel cable generally comes with a swivel hook (not shown in the figure) for hooking and hanging a heavy object; a deceleration device 40, installed on an outer side of the fixed base 22, and having a casing 41 fixed to the fixed base 22; and a clutch device 50, with a portion installed in the casing 41 of the deceleration device 40. From the appearance, only a small portion of the clutch device 50, an internal seat 51, an external sleeve 52, a control handle 521 and a cap 522 is exposed, and the other portions of the components are hidden inside the internal seat 51 and the interior of the external sleeve 52.

Figure 3:
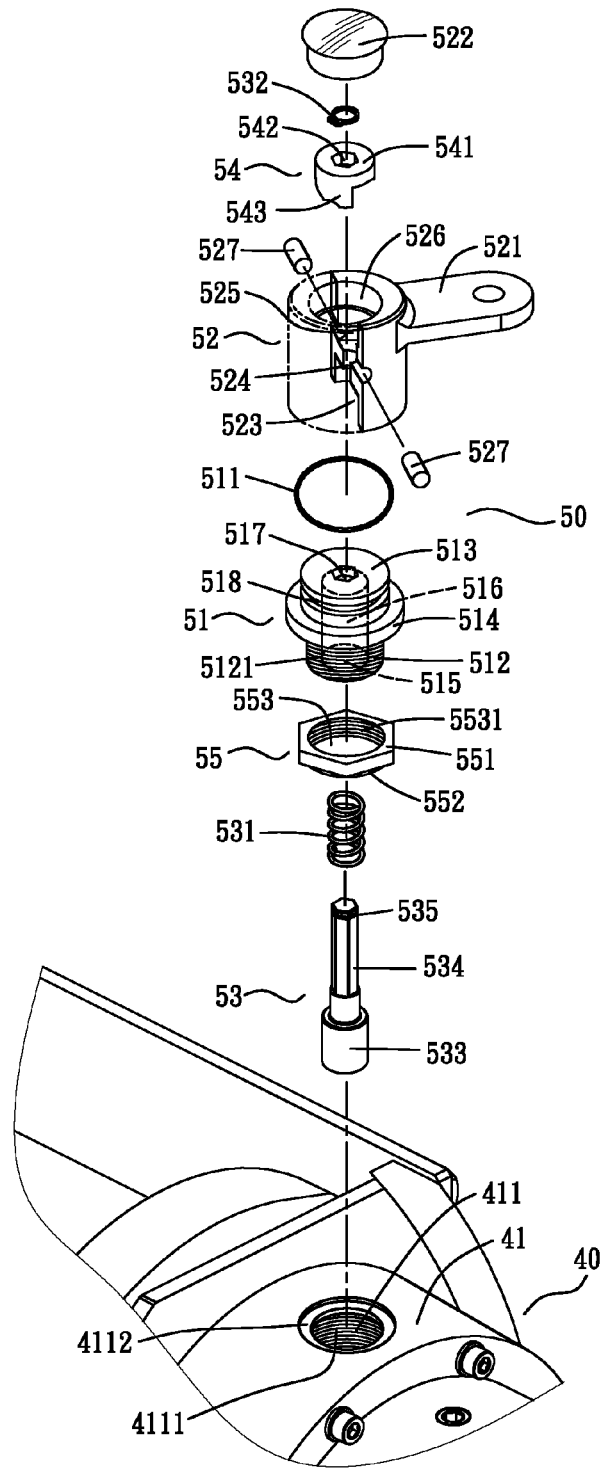
FIG. 3 is an exploded view of a clutch device and a deceleration device of a preferred embodiment of the present invention.
Figure 4:
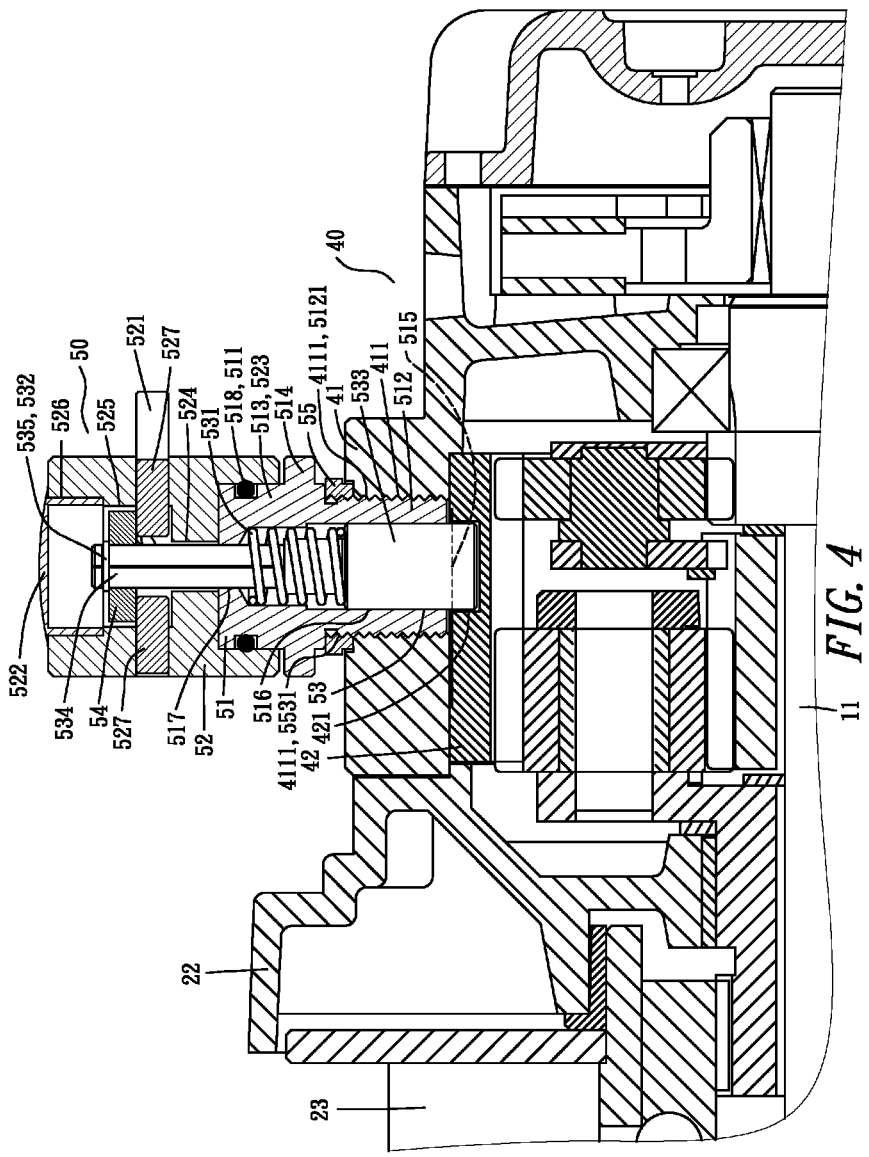
FIG. 4 is a partial cross-sectional view of a preferred embodiment of the present invention situated at an "engaged" mode.

With reference to FIGS. 3 and 4, a rotating shaft 11 connected to the power source 10 is inserted into the center of the deceleration device 40 to connect the dynamic force, so that the dynamic force of the power source 10 can be transmitted to the deceleration device 40. The deceleration device 40 comes with several levels of decelerations, wherein an outer ring body 42 is provided as a components for transmitting the dynamic force between the deceleration device 40 and the cable pulley 30, and when the outer ring body 42 remains still at a fixed position, the dynamic force can be transmitted from the deceleration device 40 to the cable pulley 30 (to define an "engaged" effect). If the outer ring body 42 is not fixed (or can be rotated), the dynamic force cannot be transmitted from the deceleration device 40 to the cable pulley 30 (to define a "disengaged" effect), and at least one insert slot 421 is formed on an external surface of the outer ring body 42. A casing 41 of the deceleration device 40 has a connecting slot 411 formed thereon (as shown in FIG. 3), and the connecting slot 411 can be formed corresponding to the insert slot 421, but the connecting slot 411 has a diameter greater than that of the insert slot 421, and an internal thread 4111 is formed on an inner wall of the connecting slot 411, and a sunken cavity 4112 with an expanded external diameter is formed on a top surface.

In FIGS. 3 and 4, the clutch device 50 is comprised of an internal seat 51, an O-ring 511, an external sleeve 52, a control handle 521, a cap 522, a clutch lever 53, an elastic element 531, a binding ring 532, a wedge-shaped member 54 and a positioning nut 55, wherein the internal seat 51 includes a cylindrical lower insert pipe 512, a cylindrical upper insert pipe 513 and an outwardly expanded baffle 514 installed at the middle, and an external thread 5121 is formed on an outer wall of the lower insert pipe 512 and screwed with the corresponding internal thread 4111 of the connecting slot 411, and the bottom end of the internal seat 51 has an opening 515 to form a chamber 516 disposed deeply therein, and a non-circular polygonal groove 517 (such as a hexagonal groove) is formed at the top end of the upper insert pipe 513, and a ring groove 518 is concavely formed on an external surface of the internal seat 51 for sheathing the O-ring 511.

The external sleeve 52 is in a circular cylindrical shape, and the control handle 521 is fixed onto an external surface of the external sleeve 52, and the bottom of a lower containing cavity 523 is extended inwardly, and the depth and internal diameter correspond to the height and the external diameter of the upper insert pipe 513 of the internal seat 51 respectively, and a penetrating groove 524 is formed and penetrated upwardly from the lower containing cavity 523 to form an expanded upper chamber 525 having a plug opening 526 formed at the top surface for installing the cap 522 and keeping the cap 522 in the upper chamber 525, and a set of radially installed lifting rods 527 installed at positions proximate to the bottom of the upper chamber 525 (or axially installed and fixed), and the two lifting rods 527 are disposed on the same straight line, and the interval (or distance) between two inner ends is not smaller than the width of the penetrating groove 524.

The clutch lever 53 has an insert member 533 contained in the chamber 516 and selectively controlled to pass downwardly out from the opening 515 and press into the insert slot 421 of the outer ring body 42. The insert member 533 has a non-cylindrical polygonal column 534 (such as a hexagonal column) disposed at the top of the insert member 533, and the polygonal shape matches with the shape of the polygonal groove 517, and the elastic element 531 can be sheathed on the polygonal column 534, and a ring groove 535 is concavely formed at the top end proximate to the external surface of the polygonal column 534 for clamping the binding ring 532 (such as a C-shaped binding ring).

Figure 5:
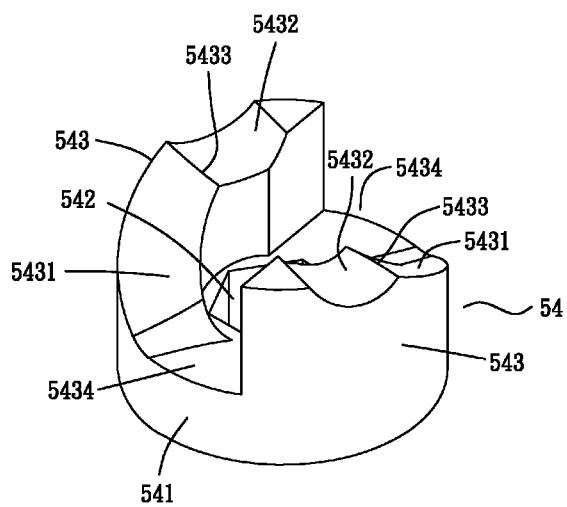
FIG. 5 is a bottom view of a wedge-shaped member of a preferred embodiment of the present invention.

The wedge-shaped member 54 has a circular dish shaped base 541, a non-cylindrical polygonal groove 542 (such as a hexagonal groove) vertically penetrated through the middle for passing the polygonal column 534 of the clutch lever 53. With reference to FIG. 5 for an upside-down wedge-shaped member 54), a set of tuning members 543 are symmetrically installed with a curve on both lateral sides of the bottom of the base 541, and the bottom surface of each tuning member 543 is mainly divided into a descending slope 5431 and a press-in slot 5432, wherein the descending slope 5431 is progressively descended from the bottom of the base 541 until it reaches to the lowest position and passes through a boundary 5433 into the press-in slot 5432, and an interval is formed between the two tuning members 543, and the narrowest interval occurs at the edges of the base 541. In other words, a through hole 5434 is formed, and the through hole 5434 has a width not smaller than the width of the lifting rod 527.

The positioning nut 55 has a polygonal operating member 551 (such as a hexagonal operating member) and a press-in member 552 disposed at the bottom of the positioning nut 55. The press-in member 552 is contained in the sunken cavity 4112 of the casing 41 of the deceleration device 40. The positioning nut 55 has a connecting slot 553 penetrated through the center of the positioning nut 55 and an internal thread 5531 formed on an inner wall of the connecting slot 553. The positioning nut 55 can be screwed and coupled by engaging the internal thread 5531 of the positioning nut 55 with the external thread 5121 of the lower insert pipe 512 of the internal seat 51, so as to combine the positioning nut 55 with the exterior of the lower insert pipe 512.

Figure 6:
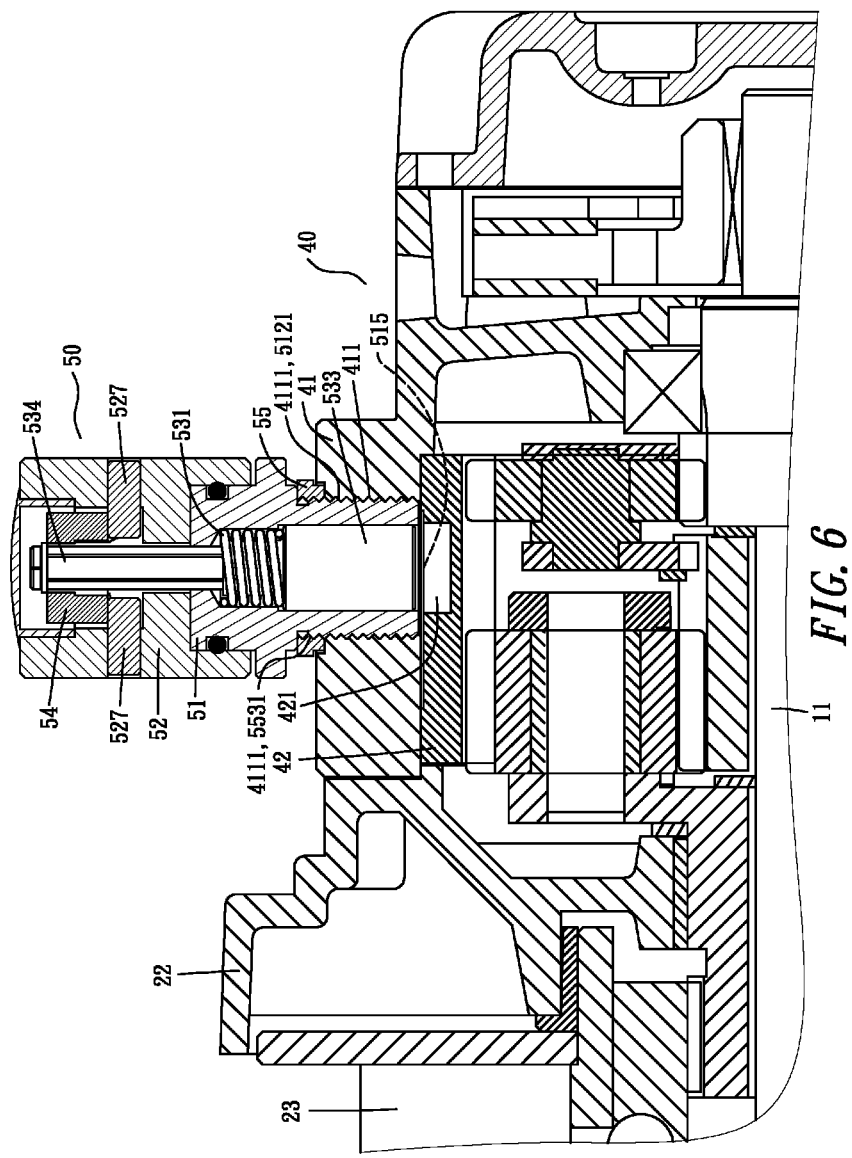
FIG. 6 is a partial cross-sectional view of a preferred embodiment of the present invention situated at a "disengaged" mode.

In FIGS. 1 and 6, an elastic element 531 is sheathed on the polygonal column 534 of the clutch lever 53 first, and then the polygonal column 534 is passed from top to bottom and into the polygonal groove 517 of the internal seat 51, so that a connection of the same shape (such as a hexagonal shape) between the polygonal column 534 and the polygonal groove 517 can be achieved. In the meantime, the insert member 533 of the clutch lever 53 enters and remains in the chamber 516 of the internal seat 51, and then an O-ring 511 is sheathed on the groove 518, and the upper insert pipe 513 of the internal seat 51 is installed in the lower containing cavity 523 of the external sleeve 52, and the polygonal column 534 of the clutch lever 53 is passed through the interval between the penetrating groove 524 and the two lifting rods 527 to enter into the upper chamber 525, and then the wedge-shaped member 54 is installed in the upper chamber 525, so that the two through holes 5434 of the wedge-shaped member 54 are arranged on a lifting rod 527, and the polygonal column 534 of the clutch lever 53 is passed from bottom to top and into the polygonal groove 542 of the wedge-shaped member 54, and a connection of the same shape (such as a hexagonal shape) can be achieved between the polygonal column 534 and the polygonal groove 542, and then a binding ring 532 is clamped into the groove 535 of the polygonal column 534, such that the internal seat 51, the external sleeve 52, the clutch lever 53 and wedge-shaped member 54 can be assembled and connected preliminarily, and then the positioning nut 55 is screwed by engaging the internal thread 5531 of the connecting slot 553 with the external thread 5121 of the lower insert pipe 512 of the internal seat 51 to combine the positioning nut 55 with the exterior of the lower insert pipe 512, and then the lower insert pipe 512 of the internal seat 51 is rotated from its external thread 5121 into the internal thread 4111 of the connecting slot 411 of the deceleration device 40 casing 41 to screw and connect the lower insert pipe 512 into the connecting slot 411. During the process of combining the internal seat 51 with the connecting slot 411, the internal seat 51 is further combined with the positioning nut 55, finally the press-in member 552 of the positioning nut 55 can be contained and fixed into the sunken cavity 4112 of the deceleration device 40 casing 41. In the meantime, the lower insert pipe 512 and the connecting slot 411 are combined tightly. Finally, the cap 522 is plugged into the plug opening 526 of the upper chamber 525 to complete the assembling of the clutch device 50.

In FIG. 1, after the clutch device 50 is assembled, the clutch device 50 is fixed to the control handle 521 on the external surface of the external sleeve 52, preferably with a certain angular position disposed longitudinally on a side of the whole power winch 1 to facilitate the operation, so that during the process of combining the lower insert pipe 512 of the internal seat 51 with the connecting slot 411, and finally it is necessary to keep the control handle 521 to be remained at the angular position. Therefore, when the lower insert pipe 512 and the connecting slot 411 are almost but not completely combined with each other, it is necessary to adjust the control handle 521 to an appropriate angular position, and then the positioning nut 55 is turned to abut the lower insert pipe 512 to assure that the control handle 521 is remained at the appropriate angular position.

In FIG. 4, the boundary 5433 of the wedge-shaped member 54 is in contact with the bottom of the upper chamber 525. In other words, the wedge-shaped member 54 is situated at a relatively low position, so that a portion of the insert member 533 of the clutch lever 53 is passed out from the opening 515 of the lower insert pipe 512 or entered and remained in the insert slot 421 of the outer ring body 42. The effect is to keep the outer ring body 42 at a fixed position (or achieve the "engaged" effect), so that the dynamic force can be transmitted from the deceleration device 40 to the cable pulley 30 to achieve the effect of releasing and rewinding the steel cable by the dynamic force.

When a user releases the steel cable manually (to break open the connection of dynamic force between the cable pulley 30 and the deceleration device 40), the user simply needs to turn the control handle 521 by hand to horizontally move (deflect) the control handle 21 within a radian range, and then the internal structure of the clutch device 50 changes its status from the status as shown in FIGS. 1 and 4 to the status as shown in FIGS. 2 and 6. When the control handle 521 is turned to move (or deflect) horizontally, the whole external sleeve 52 is linked and rotated synchronously, so that the two lifting rods 527 inside the external sleeve 52 are rotated synchronously as well. When the two lifting rods 527 are rotated, the descending slope 5431 of the wedge-shaped member 54 is pushed, so that the wedge-shaped member 54 is ascended gradually due to the effect of component forces, and finally when the two lifting rods 527 is rotated to a position across the boundary 5433, and entered and remained in the press-in slot 5432. Now, the external sleeve 52 has rotated to an angle (such as an angle approximately equal to 115°), and the wedge-shaped member 54 is lifted to a relatively high position (compared with the position as shown in FIG. 4). During the process, the clutch lever 53 is affected by the binding ring 532 and pushed by the lifting force of the wedge-shaped member 54, so that the clutch lever 53 is ascended gradually while compressing the elastic element 531. When the two lifting rods 527 are rotated to enter and remain in the press-in slot 5432, the insert member 533 of the clutch lever 53 is lifted to a position and separated from the insert slot 421 of the outer ring body 42 (as shown in FIG. 6). Now, the outer ring body 42 is not fixed (or has a "disengaged" effect) and can be rotated, so that the dynamic force of the deceleration device 40 cannot be transmitted to the cable pulley 30. Now, the user can manually release the steel cable in a quick and smooth manner.

When the user wants to resume the dynamic force of the power winch 1 for the effect of releasing or rewinding the steel cable, the user simply needs to turn the control handle 521 in an opposite direction as shown in FIGS. 2 and 6 to resume its status from the status as shown in FIGS. 2 and 6 to the status as shown in FIGS. 1 and 4. In the operation, the control handle 521 is rotated transversally in an opposite direction to link the whole external sleeve 52 to rotate synchronously, so that the two lifting rods 527 disposed in the external sleeve 52 are also rotated synchronously to resume its position from the position in the press-in slot 5432 to the position in the through hole 5434. Without any lifting effect caused by external forces, the wedge-shaped member 54 and the clutch lever 53 are descended by the resilience force of the elastic element 531, and the insert member 533 of the clutch lever 53 enters and remains in the insert slot 421 of the outer ring body 42 again, so that the outer ring body 42 is positioned at a fixed position (or has the "engaged" effect) again, and the dynamic force is transmitted from the deceleration device 40 to the cable pulley 30 to achieve the effect of rewinding or releasing the steel cable by the dynamic force.

From the description above, the present invention mainly improves the assembly of the clutch device 50 of the power winch 1 to be a sealed assembly. In the description of the aforementioned embodiments together with the illustration of related drawings, it is clear that the internal seat 51 and the casing 41 are screwed and fixed with each other to assure a sealed connection, and the external sleeve 52 and the internal seat 51 are fixed by an insertion method particularly by sheathing the O-ring 511, so as to provide a more secured sealing effect; the lifting rod 527 is inserted and fixed into the external sleeve 52 to achieve a sealed connection with the external sleeve 52; and finally the plug opening 526 at the top side of the external sleeve 52 is covered by the cap 522 to achieve a sealed assembly. In addition, the power winch 1 of the present invention can be moved horizontally by turning the control handle 521 to achieve the effect of controlling and operating the clutch device. During the operation process, there is no issue of having holes or gaps from being exposed. Therefore, the power winch 1 of the present invention does not have any problem with the water (such as the rainwater), dust or other foreign matters entering into the clutch device or the issue of damaging the components or having a failure or malfunction. In the meantime, the operation of the clutch device does not have any risk of clamping the operator's hand or other foreign matters during the operation. Obviously, the present invention can achieve the expected effects and objectives.

In summation of the description above, the present invention achieves the expected objectives and effects and complies with the patent application requirements, and thus is duly filed for patent application. While the invention has been described by means of specific embodiments, numerous modifications and variations could be made thereto by those skilled in the art without departing from the scope and spirit of the invention set forth in the claims.

What is claimed is:

1. A power winch horizontal-pull clutch device, providing a dynamic force by a power source, and transmitting the dynamic force to a cable pulley after the clutch device is decelerated by a deceleration device, so that the cable pulley is rotated in forward and backward directions to release and rewind a steel cable wound on the cable pulley respectively; a casing of the deceleration device has a connecting slot formed thereon and an internal thread formed on an inner wall of the casing; the deceleration device comprising an outer ring body, and an insert slot formed on an external surface; the power winch comprises the clutch device, and the connecting slot formed on the casing of the deceleration device is fixed or not fixed to the insert slot of the outer ring body, so that the dynamic force is transmitted or not transmitted from the deceleration device to the cable pulley; characterized in that the clutch device comprises an internal seat, an external sleeve, a control handle, a cap, a clutch lever, an elastic element, a binding ring, a wedge-shaped member and a positioning nut, wherein the internal seat comprises a cylindrical lower insert pipe, a cylindrical upper insert pipe and an outwardly expanded baffle disposed at the middle, and an external thread is formed on an outer wall of the lower insert pipe, and an opening is formed at a bottom end of the internal seat, and a chamber is formed therein, and a non-circular polygonal groove is formed and penetrated through a top end of the upper insert pipe; the external sleeve is in a cylindrical shape, and the control handle is fixed onto the external surface of the external sleeve, and a bottom of the external sleeve is extended into a lower containing cavity, and the lower containing cavity has an upwardly formed penetrating groove which is extended and expanded outwardly to form an upper chamber with a plug opening formed at a top surface and provided for plugging and installing the cap, and a set of two radially installed lifting rods are installed at positions proximate to the bottom inside the upper chamber, and an interval between inner ends of the two lifting rods is not smaller than the width of the penetrating groove; the clutch lever has an insert member contained in the chamber and downwardly passed out from the opening by a selective control and pressed into the insert slot of the outer ring body; a non-cylindrical polygonal column is coupled to the top surface of the insert member and has a polygonal shape matched with the shape of the polygonal groove of the internal seat, and the elastic element is sheathed on the polygonal column, and a ring groove is concavely formed on an external surface of the polygonal column and at a position proximate to the top end for clamping the binding ring; the wedge-shaped member has a circular dish shaped base, a polygonal groove penetrated through the middle for passing the polygonal column of the clutch lever, and a set of two tuning members are installed with a symmetrical curve on both lateral sides of the bottom of the base, and the bottom of each tuning member is divided into a descending slope and a press-in slot, and the descending slope descends gradually from the bottom of the base and passes through a boundary to enter into the press-in slot when reaching the lowest position, and an interval is formed between the two tuning members and the narrowest interval occurs at an edge of the base, so as to form two through holes each with a width not smaller than the width of the lifting rod; the positioning nut has a polygonal operating member with a connecting slot penetrated through the middle and an internal thread formed on an inner wall of the polygonal operating member; during assembling, the elastic element is sheathed on the polygonal column of the clutch lever, and the polygonal column is passed and passed into the polygonal groove of the internal seat to achieve a connection of the same shape, while the insert member of the clutch lever is entered into the chamber of the internal seat; and then the upper insert pipe of the internal seat is installed into the lower containing cavity of the external sleeve, such that the polygonal column of the clutch lever is passed through an interval between the penetrating groove and the two lifting rods and entered into the upper chamber, and then the wedge-shaped member is installed in the upper chamber, such that the two through holes of the wedge-shaped member are disposed on a lifting rod, and the polygonal column of the clutch lever is passed into the polygonal groove of the wedge-shaped member to achieve a connection of the same shape, and then the binding ring is clamped into the groove of the polygonal column, and then the positioning nut is screwed and connected by engaging the internal thread of the connecting slot with the external thread of the lower insert pipe of the internal seat, and the lower insert pipe of the internal seat is rotated from the external thread into the internal thread of the connecting slot on the casing of the deceleration device, so that the lower insert pipe and the connecting slot are combined, and finally the cap is plugged into the plug opening of the upper chamber.

2. The power winch horizontal-pull clutch device according to claim 1, wherein the internal seat further includes a ring groove concavely formed on an external surface of the internal seat for sheathing an O-ring.

3. The power winch horizontal-pull clutch device according to claim 1, wherein the connecting slot formed on the casing of the deceleration device has a sunken cavity with an expanded external diameter formed at the top surface, and the positioning nut has a press-in member disposed at the bottom of the operating member and contained and fixed in the sunken cavity.

* * * * *